US012381684B2

(12) United States Patent
Ramakrishna et al.

(10) Patent No.: US 12,381,684 B2
(45) Date of Patent: Aug. 5, 2025

(54) SRS LAYER AND PORT ESTIMATION FOR UPLINK AND DOWNLINK TRANSMISSION

(71) Applicant: Rakuten Symphony, Inc., Tokyo (JP)

(72) Inventors: Raghavendra Madanahally Ramakrishna, Bangalore (IN); Ronak Bharatkumar Lalwala, Bangalore (IN); Vijayakumar Yalamalli, Bangalore (IN); Vihang Kamble, Surrey (GB)

(73) Assignee: Rakuten Symphony, Inc., Tokyo (JP)

( * ) Notice: Subject to any disclaimer, the term of this patent is extended or adjusted under 35 U.S.C. 154(b) by 247 days.

(21) Appl. No.: 18/126,626

(22) Filed: Mar. 27, 2023

(65) Prior Publication Data

US 2024/0333453 A1 Oct. 3, 2024

(51) Int. Cl.
*H04L 5/00* (2006.01)
*H04B 17/336* (2015.01)

(52) U.S. Cl.
CPC ......... *H04L 5/0051* (2013.01); *H04B 17/336* (2015.01)

(58) Field of Classification Search
CPC .......................... H04L 5/0051; H04B 17/336
See application file for complete search history.

(56) References Cited

U.S. PATENT DOCUMENTS

| | | | | |
|---|---|---|---|---|
| 10,715,233 | B2* | 7/2020 | Yan | H04L 5/0048 |
| 2019/0068260 | A1* | 2/2019 | Yan | H04B 7/0404 |
| 2023/0030275 | A1* | 2/2023 | Huang | H04L 5/0051 |
| 2023/0283328 | A1* | 9/2023 | Sayed Hassan | H04B 7/0456 370/328 |
| 2024/0313832 | A1* | 9/2024 | Hou | H04L 25/021 |
| 2024/0333453 | A1* | 10/2024 | Ramakrishna | H04B 17/336 |
| 2024/0372754 | A1* | 11/2024 | Åhlander | H04L 25/0224 |
| 2024/0421870 | A1* | 12/2024 | Zhao | H04B 7/0639 |

* cited by examiner

*Primary Examiner* — Zhiren Qin
(74) *Attorney, Agent, or Firm* — Myers Wolin, LLC

(57) ABSTRACT

Techniques for selecting layers and ports for Multiple-Input-Multiple-Output (MIMO) beamforming are provided. In some implementations, the techniques may include receiving a plurality of Sounding Reference Signals (SRSs) transmitted by a plurality of SRS ports, each of the plurality of SRSs corresponding with a SRS port of a UE. In addition, the techniques may include measuring a Signal-to-Noise Ratio (SNR) for each of the plurality of SRS ports, and estimating a wideband channel port correlation matrix across the plurality of SRS ports. The techniques may include setting a correlation threshold and a SNR threshold. Further, the techniques may include selecting one or more SRS ports from the plurality of SRS ports that satisfy a condition of being equal to or less than the correlation threshold and equal to or greater than the SNR threshold, where the layers correspond with a total number of SRS ports that satisfy the above condition.

17 Claims, 5 Drawing Sheets

SRS LAYER AND PORT ESTIMATION FOR UPLINK AND DOWNLINK TRANSMISSION

TECHNICAL FIELD

In some example embodiments, the subject matter herein generally relates to mobile wireless communication systems and a more specifically to Sounding Reference Signal (SRS) layer and port estimation.

BACKGROUND

In massive Multi-Input and Multi-Output (MIMO) systems, SRS based channel sounding provides fine granularity channel information that is used for beamforming in both the Downlink (DL) and Uplink (UL) directions. The SRS is a reference signal transmitted by User Equipment (UE) in the uplink direction and is used by a base station (gNB) to estimate the uplink channel quality over a wide bandwidth.

The SRS gives information about the combined effect of multipath fading, scattering, Doppler, and power loss of the transmitted signal. Sounding reference signals are uplink physical signals employed by user equipment (UE) for uplink channel sounding, including channel quality estimation and synchronization.

A base station (gNB) estimates the channel quality using the SRS and manages further resource scheduling, Beam management, and power control of the signal. Thus, SRS provides information to gNB about the channel over the full bandwidth. The gNB may use this information to make decisions concerning resource allocation in bandwidth regions that have better channel quality.

Precise channel estimation is required to obtain the beamforming performance required for massive MIMO systems. Beamforming is used to direct the radio signal energy toward a specific receiver or UE. In single user MIMO (SU-MIMO) systems multiple data streams, referred to as layers may be transmitted to a single user.

In multi-user MIMO (MU-MIMO), different layers in separate beams are simultaneously sent to different users using the same time and frequency resource, thereby increasing the network capacity. For efficient MU-MIMO, the interference between the users should be kept low. This can be achieved by using beamforming with null forming such that when a layer is sent to one user, nulls are formed in the directions of the other simultaneous users.

Massive MIMO, which is an extension of MIMO, is a way to deliver the theoretical gains of MU-MIMO under practical circumstances. Massive MIMO expands legacy systems by adding a much higher number of antennas at the base station (gNB). This high or "massive" number of antennas helps focus or direct the radio signal to the UEs.

To achieve the drastic improvements in throughput and efficiency of massive MIMO, the ability to acquire accurate channel state information is needed. In general this may be done by exploiting uplink SRSs and channel reciprocity in Time Division Duplex (TDD) mode. In TDD mode, which is the dominant mode in 5G deployments, the gNB may utilize the channel estimation result from the SRS for UL as well as DL based on channel reciprocity in TDD.

SRS based downlink beamforming using uplink channel estimation gets the correlation coefficient between SRSs received from each receiver of a base station and obtains the maximum beamforming gain by tracking down the location of a mobile station accurately.

Since a UE has multiple reception ports, the gNB channel should be sounded at all the receive ports at the UE. Sounding on all the receive ports, however, does not guarantee that the UE can be served with the same rank as number of UE receive ports. This is because the channel sounded from UE ports may be partially or fully correlated based on the deployment scenario. In such scenarios, the rank and identity of which sounded ports to be used for DL transmission UL reception needs to be assigned.

With single/multiuser massive MIMO beamforming, when any of the user SRS port is noisy or correlated to the other assigned port during Multi-User (MU) transmission, the performance degrades significantly due to channel leakage of the poor SRS port to all co-scheduled ports, which may be from same UE or different UE. Beamforming performance improves significantly when used with the correct or highest quality SRS ports.

Thus, the need exists for a solution to select the optimal number of layers and ports for data transmission.

SUMMARY

In one general aspect, a method of selecting layers and ports for MIMO beamforming is provided. The method may include receiving a plurality of Sounding Reference Signals (SRSs) transmitted by a plurality of SRS ports, where each of the plurality of SRSs corresponds with a SRS port of an User Equipment (UE). The method may include measuring a Signal-to-Noise Radio (SNR) for each of the plurality of SRS ports, estimating a wideband channel port correlation matrix across the plurality of SRS ports, setting a correlation threshold, and setting a SNR threshold. The method may include selecting one or more SRS ports from the plurality of SRS ports that satisfy a condition of being equal to or less than the correlation threshold and equal to or greater than the SNR threshold, where the layers correspond with a total number of SRS ports that satisfy the condition of being equal to or less than the correlation threshold and equal to or greater than the SNR threshold.

Implementations may include one or more of the following features. The method where selecting the one or more SRS ports may include: initializing a set of SRS ports by selecting the SRS port with the highest SNR; determining if a correlation between the selected SRS port and each other SRS port of the plurality of SRS ports satisfies the condition of being equal to or less than the correlation threshold and equal to or greater than the SNR threshold; selecting a next SRS port; determining if the correlation between the next selected SRS port and each other SRS port of the plurality of SRS ports satisfies the condition of being equal to or less than the correlation threshold and equal to or greater than the SNR threshold; repeating the selecting a next SRS port and the determining for each SRS port of the plurality of SRS ports until all SRS ports of the plurality of SRS ports are tested against the condition; and updating the set of SRS ports with all SRS ports that satisfy the condition of being equal to or less than the correlation threshold and equal to or greater than the SNR threshold.

The method may include performing beamforming according to the updated set of SRS ports. The method where beamforming is performed in at least one of an uplink and a downlink. The method where a number of SRS ports in the set of SRS ports is determined according to a configuration parameter, and where the set of selected SRS ports is updated be selecting a plurality of SRS ports in the set of SRS ports with the highest SNR and lowest correlation between the plurality of SRS ports with the highest SNR. The method where the set of selected SRS ports is updated be selecting a plurality of SRS ports in the set of SRS ports with the lowest correlation between the plurality of SRS ports. The method where the configuration parameter is system information indicating a number of layers. The method where the plurality of SRS ports are determined according to a capability of the UE.

In another general aspect, a wireless communication apparatus is provided. The wireless communication apparatus may include a memory configured to store a plurality of instructions and processor circuitry coupled to the memory and configured to execute the plurality of instructions to: receive a plurality of Sounding Reference Signals (SRSs) transmitted by a plurality of SRS ports, where each of the plurality of SRSs corresponds with an SRS port of an User Equipment (UE), measure a Signal-to-Noise Radio (SNR) corresponding to each of the plurality of SRS ports, estimate a wideband channel port correlation matrix across the plurality of SRS ports, set a correlation threshold, set a SNR threshold, select one or more SRS ports from the plurality of SRS ports that satisfy a condition of being equal to or less than the correlation threshold and equal to or greater than the SNR threshold.

Implementations may include one or more of the following features. The wireless communication apparatus where the processor is further configured to execute the plurality of instructions to: initialize a set of SRS ports by selecting the SRS port with the highest SNR; determine if a correlation between the selected SRS port and each other SRS port of the plurality of SRS ports satisfies the condition of being equal to or greater than the SNR threshold; select a next SRS port; determine if the correlation between the next selected SRS port and each other SRS port of the plurality of SRS ports satisfies the condition of being equal to or less than the correlation threshold and equal to or greater than the SNR threshold; repeat the selecting a next SRS port and the determining for each SRS port of the plurality of SRS ports until all of the plurality of SRS ports are tested against the condition; and update the set of SRS ports with all SRS ports that satisfy the condition of being equal to or less than the correlation threshold and equal to or greater than the SNR threshold. The wireless communication apparatus where the processor is further configured to execute the plurality of instructions to perform beamforming according to the updated set of SRS ports. The wireless communication apparatus where beamforming is performed in at least one of an uplink and a downlink. The wireless communication apparatus where a total number of SRS ports in the set of SRS ports is limited according to a configuration parameter. The apparatus where the set of selected SRS ports is updated be selecting a plurality of SRS ports in the set of SRS ports with the highest SNR and lowest correlation between the plurality of SRS ports with the highest SNR. The wireless communication apparatus where the set of selected SRS ports is updated be selecting a plurality of SRS ports in the set of SRS ports with the lowest correlation between the plurality of SRS ports. The apparatus where the configuration parameter is system information indicating a number of layers. The wireless s communication apparatus where the plurality of SRS ports are determined according to a capability of the UE.

In yet another general aspect, a non-transitory computer-readable storage medium is provided. The non-transitory computer-readable storage medium may include receiving a plurality of Sounding Reference Signals (SRSs) transmitted by a plurality of SRS ports, where each of the plurality of SRSs corresponds with an SRS port of an User Equipment (UE), measuring a Signal-to-Noise Radio (SNR) for each of the plurality of SRS ports, estimating a wideband channel port correlation matrix across the plurality of SRS ports, setting a correlation threshold, setting a SNR threshold, selecting one or more SRS ports from the plurality of SRS ports that satisfy a condition of being equal to or less than the correlation threshold and equal to or greater than the SNR threshold.

Implementations may include one or more of the following features. The non-transitory computer-readable storage medium where the instructions further cause the processing circuitry to execute a process, the process including: initializing a set of SRS ports by selecting the SRS port with the highest SNR; determining if a correlation between the selected SRS port and each other SRS port of the plurality of SRS ports satisfies the condition of being equal to or less than the correlation threshold and equal to or greater than the SNR threshold; selecting a next SRS port; determining if the correlation between the next selected SRS port and each other SRS port of the plurality of SRS ports satisfies the condition of being equal to or less than the correlation threshold and equal to or greater than the SNR threshold; repeating the selecting a next SRS port and the determining for each SRS port of the plurality of SRS ports until all SRS ports of the plurality of SRS ports are tested against the condition; and updating the set of SRS ports with all SRS ports that satisfy the condition of being equal to or less than the correlation threshold and equal to or greater than the SNR threshold.

DETAILED DESCRIPTION

Figure 1:
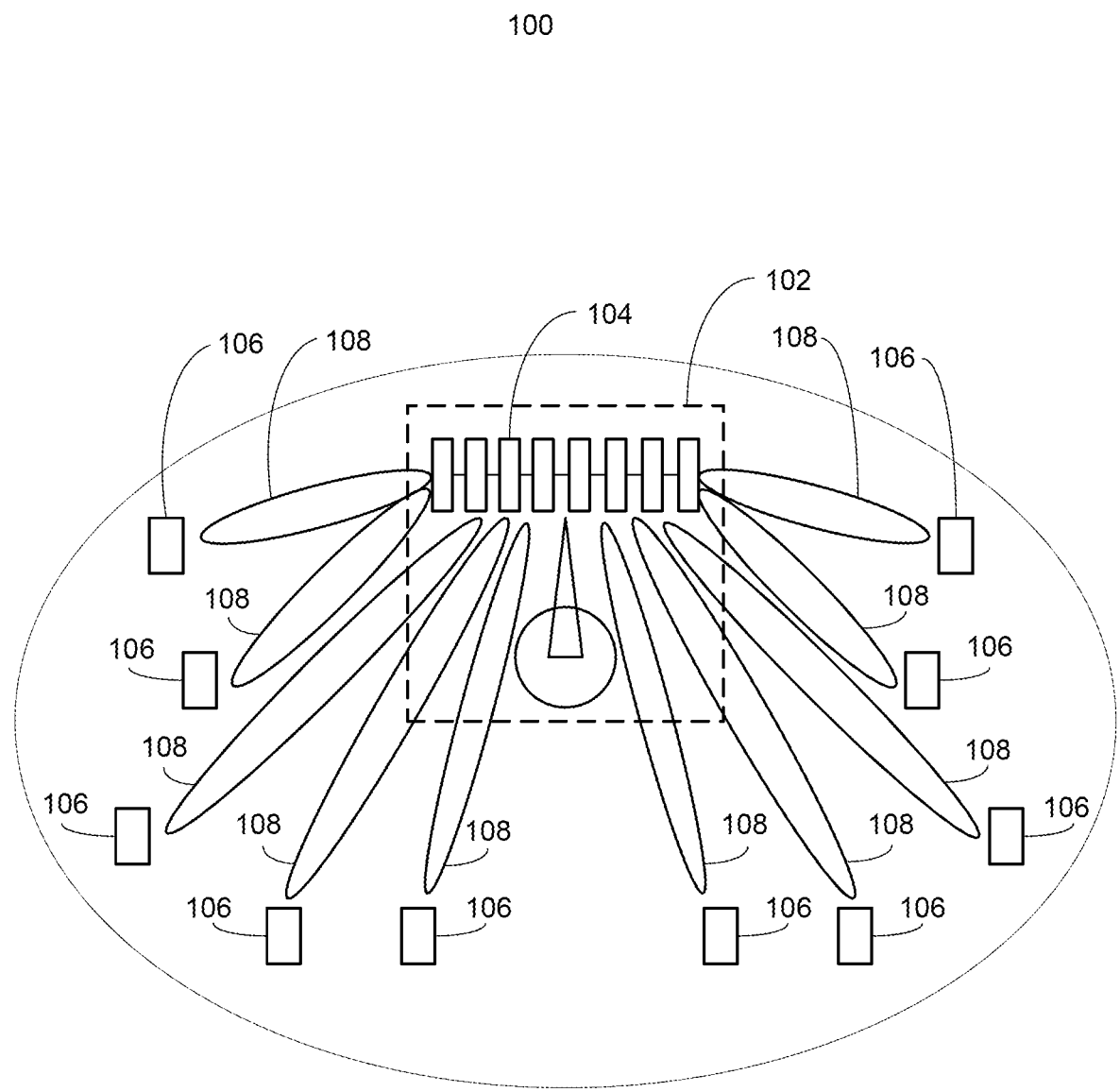
FIG. 1 illustrates an example massive MIMO base station (gNB)

FIG. 1 illustrates an example of a massive MIMO base station serving a plurality of User Equipment's (UEs). A gNB 102 may include multiple antenna arrays. As illustrated in FIG. 1, for ease of description, antenna system 104 includes 8 antenna panels. This represents 64 cross-polarized antennas (8 horizontal×8 vertical). It should be understood that in a massive MIMO system is not limited to 64 antennas and may include 128 or more antennas.

Spatial multiplexing, referred to as MIMO, is the ability to transmit multiple data streams, using the same time and frequency resource, where each data stream can be beamformed. Beamforming is used by the gNB 102 to direct the radio signal energy toward the User Equipment's (UEs) 106. Individual beams 108 are formed by the gNB 102 to direct the radio signal energy to UEs 106.

The purpose of MIMO is to increase throughput. MIMO is built on the basic principle that when the received signal quality is high, it is better to receive multiple streams of data with reduced power per stream than one data stream with full power. The potential benefit is large when the received signal quality is high and the signals (data streams) do not interfere with each other. The potential benefit diminishes when the mutual interference between streams increases. MIMO works in both UL and DL, but for simplicity the description below will be based on the DL.

In massive MIMO and MU-MIMO, the antenna system 104 simultaneously sends different layers in separate beams 108 to different users 106 using the same time and frequency resource, thereby increasing the network capacity. MU-MIMO may be used when the system finds two or more users that need to transmit or receive data at the same time. As explained, for massive MIMO and MU-MIMO to be efficient the interference between the users should be kept low by using beamforming with null forming such that when a layer is sent to one user, nulls are formed in the directions of the other simultaneous users.

The achievable capacity gains from massive MIMO and MU-MIMO depend on receiving each layer with good signal-to-interference-and-noise-ratio (SINR). As with SU-MIMO, the total DL power is shared between the different layers, and therefore the power (and thus SINR) for each user is reduced as the number of simultaneous MU-MIMO users increases. It is noted that as the number of users increases, the SINR will deteriorate further due to mutual interference between the users. Therefore, the network capacity typically improves as the number of MIMO layers increases. It should be understood that there are limitations such as reaching a point at which power sharing and interference between users result in diminishing gains, and eventually losses.

Knowledge of the radio channels between the antennas of the UE 106 and those of the base station 102 is essential to enabling beamforming, both for UL reception and DL transmission. For UL reception of data signals, channel estimates can be determined from the SRS on the UL transmissions. Channel estimates can be used to determine how to combine the signals received to improve the desired signal power and mitigate interfering signals, either from other cells or within the same cell in the case of MU-MIMO.

For TDD, the same frequency is used for both UL and DL transmission. Since the radio channel is reciprocal (the same in UL and DL), detailed short-term channel estimates from UL SRS transmission can be used to determine the DL transmission beams. This is referred to as reciprocity-based beamforming. For full channel estimation, signals should be sent from each UE antenna and across all frequencies.

Figure 2:
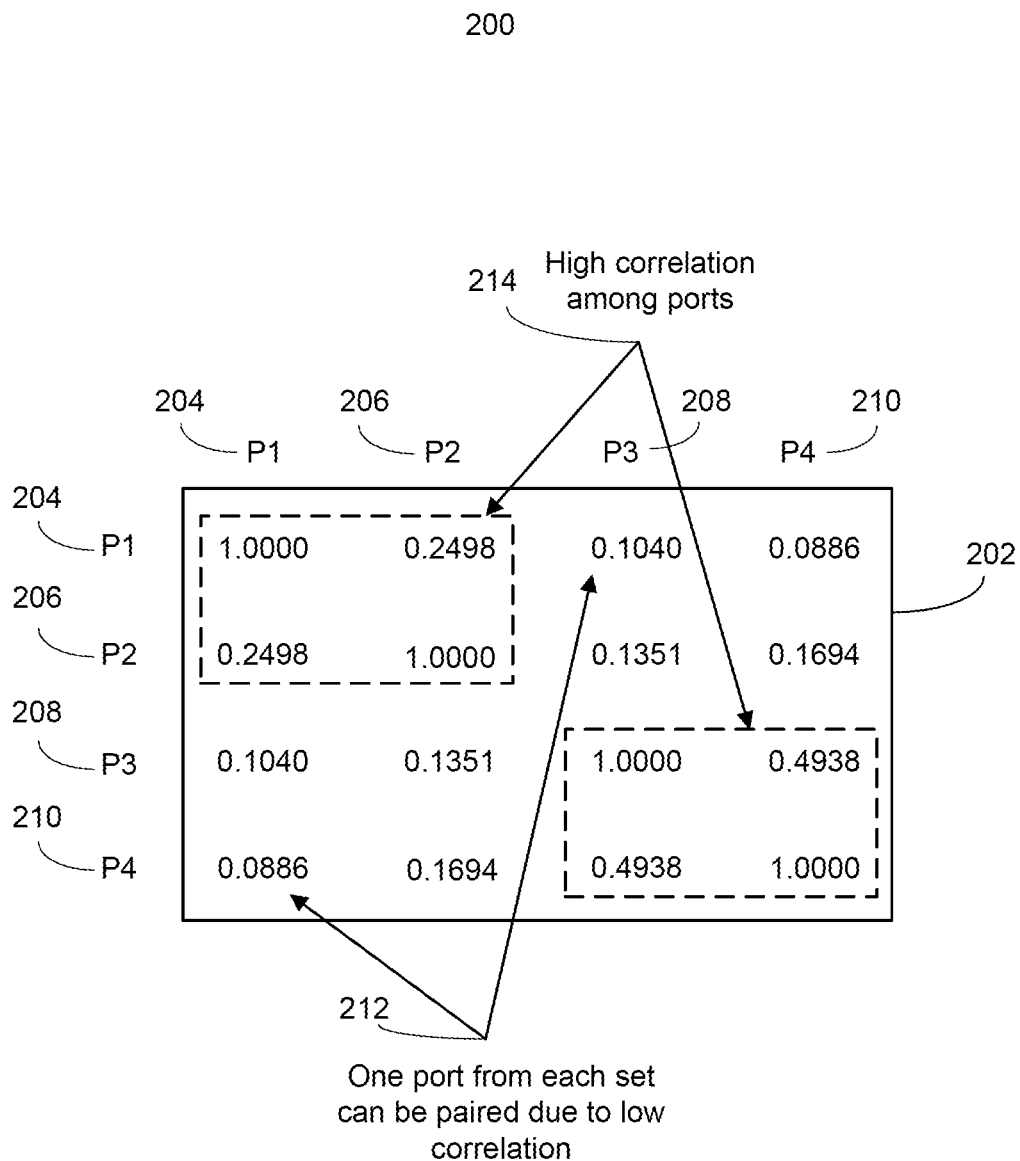
FIG. 2 illustrates a wideband channel correlation matrix across SRS ports according to an embodiment.

FIG. 2 illustrates a wideband channel correlation matrix across SRS ports. SRS based channel sounding provides the fine level of detail channel information that is necessary for beamforming in the UL and DL directions. The gNB to UE channel for all the receive ports of the UE need to be sounded. Sounding all the receive ports, however, does not guarantee that the UE can be served with the same rank as the number of receive ports because the channel sounded from each UE port may be partially/fully correlated based on the deployment scenario.

With single/multiuser massive MIMO beamforming, when any of the UE SRS ports is noisy or correlated to the other assigned port(s) during MU transmission, the performance degrades significantly due to channel leakage of the poor SRS port(s) to all co-scheduled ports. In order to determine the best or correct SRS ports for use in beamforming, a wideband channel port correlation matrix across the plurality of UE SRS ports is estimated.

The wideband channel correlation matrix across SRS ports as illustrated in FIG. 2 assumes a UE with four (4) SRS ports. It should be understood that the concepts described herein are not limited to a UE with four SRS ports, and the description applies equally to UEs with more than four SRS ports and to UEs with less than four SRS ports. Correlation matrix 202 illustrates an estimated a wideband channel port correlation matrix across a plurality of UE SRS ports. SRS ports P1-P4 are indicated by element numbers 204-210 respectively.

It can be seen that the correlation between a SRS port and itself is 1, for example the correlation between P1 (204) and P1 (204) is 1.0000. The correlation between a SRS port and any other SRS port will have a value less than 1.

From FIG. 2 it can be seen that the correlation between P1 (204) and P2 (206) is 0.2498, between P1 (204) and P3 (208) is 0.1040, and between P1 (204) and P4 (210) is 0.0886. The correlation between P2 (206) and P1 (204) is already known (0.2498), between P2 (206) and P3 (208) is 0.1351, and between P2 (206) and P4 (210) is 0.1694. The correlation between P3 (208) and P1 (204) is already known (0.1040), between P3 (208) and P2 (206) is already known (0.1351), and the value between P3 (208) and P4 (210) is 0.4938. The correlation values between P4 (210) and P1 (204), P2 (206), and P3, (208) are already known (0.0886, 0.1694, and 0.4938).

In FIG. 2, assuming a correlation threshold value is set at 0.10, the correlation values 0.0886 (P1 (204) and P4 (210)) and 0.1040 (P1 (204) and P3 (208)) would indicate the SRS ports that may be paired. These ports are identified by arrows 212 in FIG. 2. In addition, it can be seen that the values 0.2498 and 0.4938 identified by arrows 214 have a high correlation. Thus, P1 (204) and P2 (206), and P3 (208) and P4 (210) may not be a good choice due to the high correlation between the ports.

The above example assumes a correlation threshold set at 0.10, which results in selection of ports P1 (204) and P3 (208) with a correlation value of 0.1040, and P1 (204) and P4 (210) with a correlation value of 0.0886. A network operator may, however, choose to set the correlation threshold higher. For example, if the correlation threshold is set at 0.14, then the value 0.1351 (P2 (206) and P3 (208)) would also be acceptable. Thus, a network operator may determine a correlation threshold value threshold according to the type of service.

While FIG. 2 illustrates a wideband channel correlation matrix across SRS ports, it should be appreciated that the correlation between ports is not the only consideration when selecting layers and ports. The Signal-to-Noise Ratio (SNR) is another factor that should be considered in determining the layers and ports.

Figure 3:
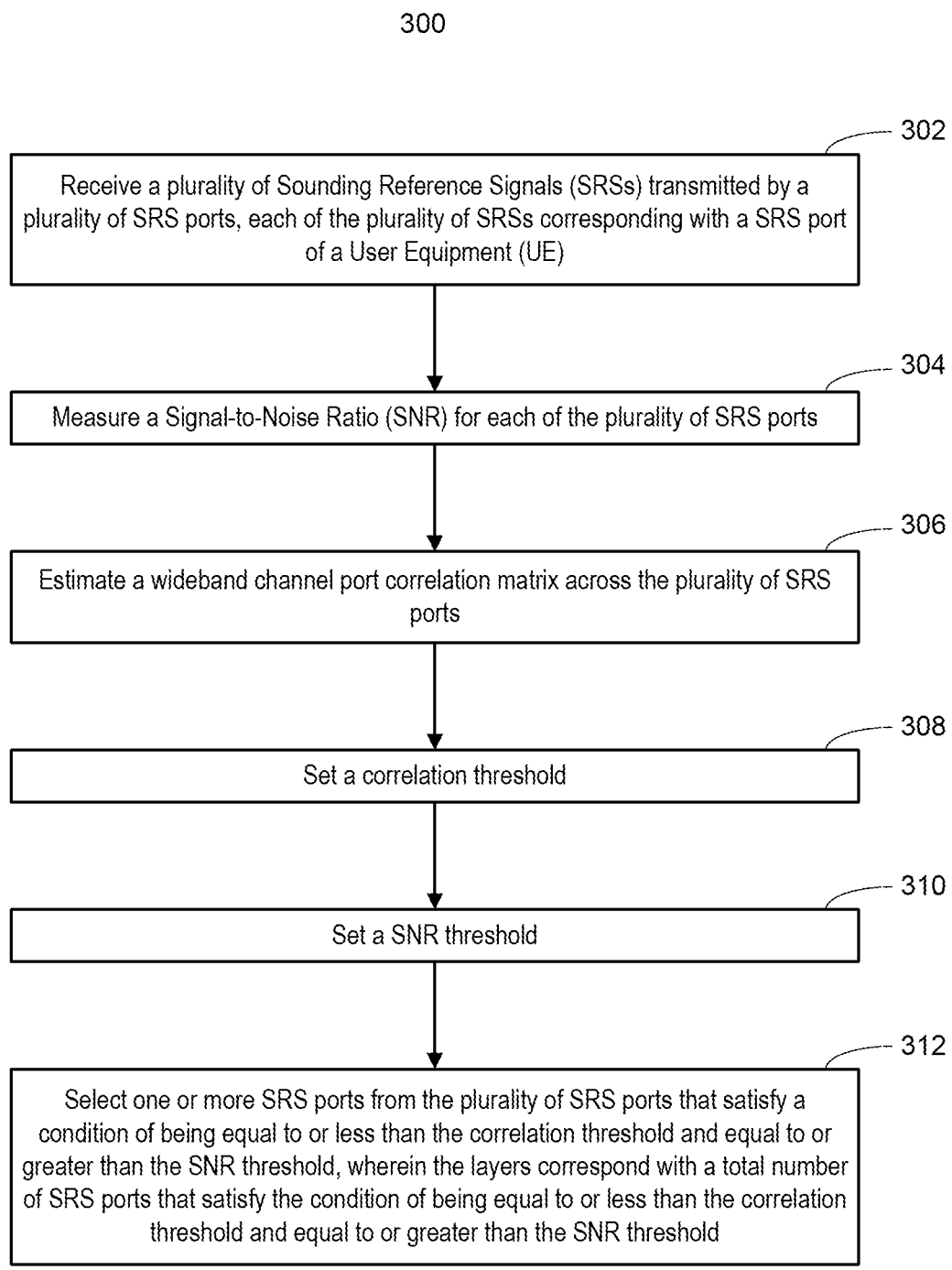
FIG. 3 is a flowchart for selecting layers and ports for MIMO beamforming according to some embodiments.

FIG. 3 is a flowchart of an example process 300 for selecting layers and ports for MIMO beamforming. As shown in FIG. 3, process 300 may include, at 302, receiving a plurality of Sounding Reference Signals (SRSs) transmitted by a plurality of SRS ports. Each of the plurality of SRSs corresponds with a SRS port of an User Equipment (UE). For example, a gNB or a Distributed Unit (DU) of the gNB may receive a plurality of SRSs transmitted by a plurality of SRS ports of a UE. Process 300 may include at 304 measuring a Signal-to-Noise Ratio (SNR) for each of the plurality of SRS ports. For example, the gNB/DU may measure the SNR for each of the plurality of SRS ports, as described above. As further shown in FIG. 3, process 300 may include, at 306, estimating a wideband channel port correlation matrix across the plurality of SRS ports. For example, the gNB or DU of the gNB may estimate a wideband channel port correlation matrix across the plurality of SRS ports, as described above and with reference to FIG. 2. As also shown in FIG. 3, process 300 may include setting a correlation threshold at 308. For example, the gNB or the DU of the gNB may set a correlation threshold, as described above and with reference to FIG. 2. As further shown in FIG. 3, process 300 may include setting a SNR threshold at 310. For example, the gNB or the DU of the gNB may set a SNR threshold, as described above. As also shown in FIG. 3, process 300 may include at 312 selecting one or more SRS ports from the plurality of SRS ports that satisfy a condition of being equal to or less than the correlation threshold and equal to or greater than the SNR threshold. Thus, the condition for selecting the layers and ports includes a correlation threshold and a SNR threshold. It should be appreciated that the layers correspond with a total number of SRS ports that satisfy the condition of being equal to or less than the correlation threshold and equal to or greater than the SNR threshold. For example, the gNB or the DU of the gNB may select one or more SRS ports from the plurality of SRS ports that satisfy a condition of being equal to or less than the correlation threshold and equal to or greater than the SNR threshold, where the layers correspond with a total number of SRS ports that satisfy the condition of being equal to or less than the correlation threshold and equal to or greater than the SNR threshold, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

In an embodiment, the gNB or the DU of the gNB may be configured to implement an algorithm or a process to select the layers and SRS ports. This process is further described with reference to FIG. 4

Figure 4:
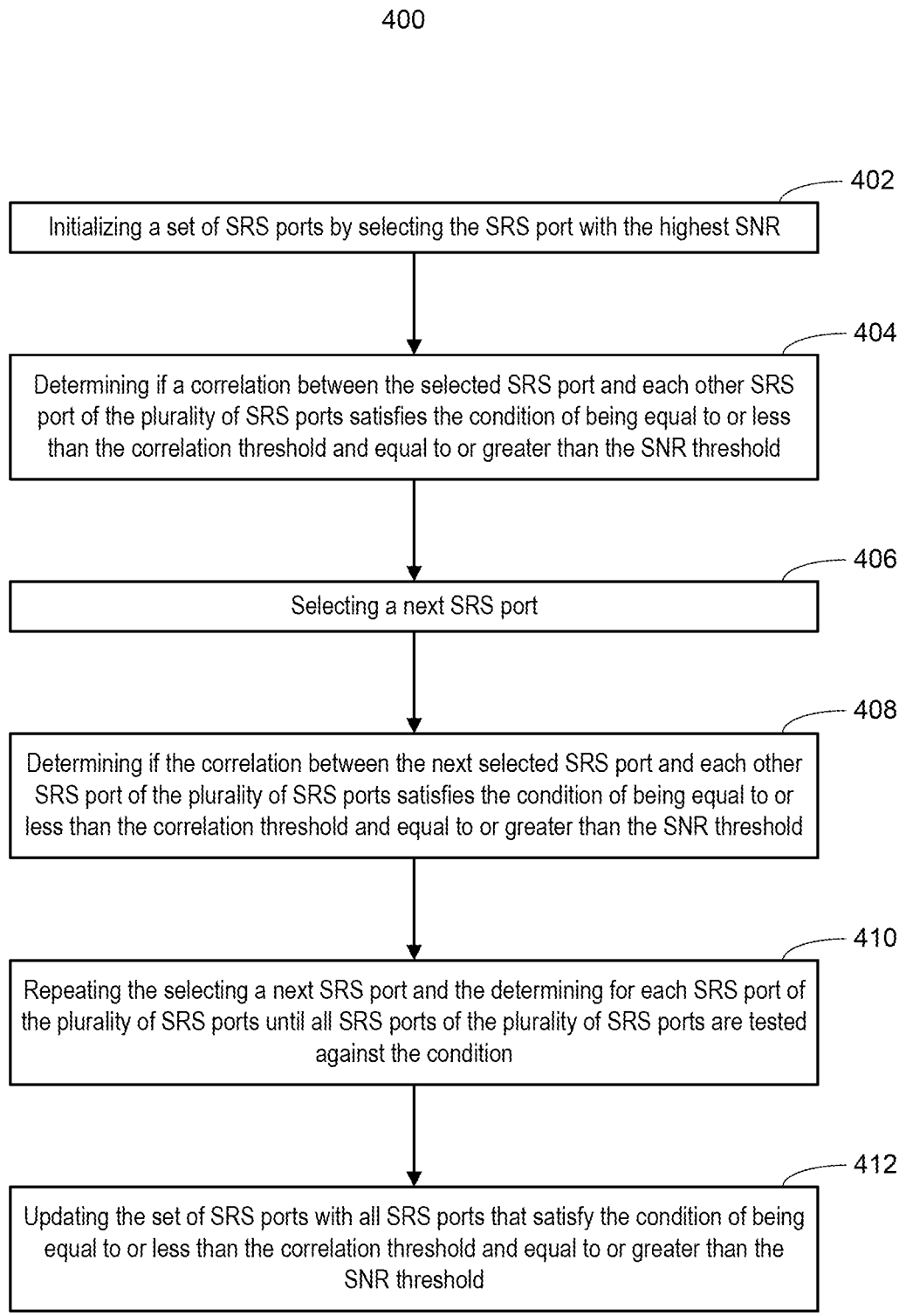
FIG. 4 is a flowchart for selecting one or more SRS ports according to some embodiments.

FIG. 4 is a flowchart of an example process 400 for selecting the one or more SRS ports. Process 400 may include additional implementations, such as any single implementation or any combination of implementations described below and/or in connection with one or more other processes described elsewhere herein. In a first implementation, selecting the one or more SRS ports may include initializing a set of SRS ports by selecting the SRS port with the highest SNR at 402. The SRS port with the highest SNR is selected as an anchor point, and a set is initialized with the SRS port with the highest SNR. The implementation includes determining if a correlation between the selected SRS port (initially selected SRS port with highest SNR) and each other SRS port of the plurality of SRS ports satisfies the condition of being equal to or less than the correlation threshold and equal to or greater than the SNR threshold at 404.

As an illustrative example, with reference to FIG. 2, assume that P1 (204) is the port with the highest SNR. It is determined whether a correlation between the selected SRS port with the highest SNR (P1 (204)) and each other SRS port (P2 (206), P3 (208), and P4 (210)) of the plurality of SRS ports satisfies the condition of being equal to or less than the correlation threshold and equal to or greater than the SNR threshold.

The implementation includes selecting a next SRS port at 406. Following the above example, the next port may be P2 (206). The implementation includes determining if the correlation between the next selected SRS port (P2 (206)) and each other SRS port of the plurality of SRS ports (P1 (204), P2 (208), and P4 (210)) satisfies the condition of being equal to or less than the correlation threshold and equal to or greater than the SNR threshold at 408. Here the correlation between P2 (206) and P1 (204), P2 (206) and P3 (208), and P2 (206) and P4 (210) are tested against the condition of being equal to or less than the correlation threshold and equal to or greater than the SNR threshold. Note that the correlation between P1 (204) and P2 (206) has already been tested against the condition.

The implementation includes repeating the selecting of a next SRS port and the determining for each SRS port of the plurality of SRS ports until all SRS ports of the plurality of SRS ports are tested against the condition at 410. Following the same example, P3 (208) may be the next SRS port selected. Thus, the correlation between P3 (208) and P1 (204), P3 (208) and P2 (206), and P3 (208) and P4 (210) are tested against the condition of being equal to or less than the correlation threshold and equal to or greater than the SNR threshold. Note that the correlation between P3 (208) and P1 (204) as well as P3 (208) and P2 (206) have already been tested against the condition. The selecting and the determining is repeated until the condition of being equal to or less than the correlation threshold and equal to or greater than the SNR threshold is tested against every combination of SRS ports, which correspond to every value is the correlation matrix, for example correlation matrix 202 in FIG. 2. It should be appreciated that while the nonlimiting example illustrated in FIG. 2 is a 4×4 estimated wideband channel port correlation matrix across the plurality of SRS ports, the estimated wideband channel port correlation matrix may be smaller or larger depending on the number of UE SRS ports.

The implementation includes, at 412, updating the set of SRS ports with all SRS ports that satisfy the condition of being equal to or less than the correlation threshold and equal to or greater than the SNR threshold. Following the example of FIG. 2, with a correlation threshold value of 0.10, the set of SRS ports will be updated to include P1 (204), P3 (208), and P4 (210).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
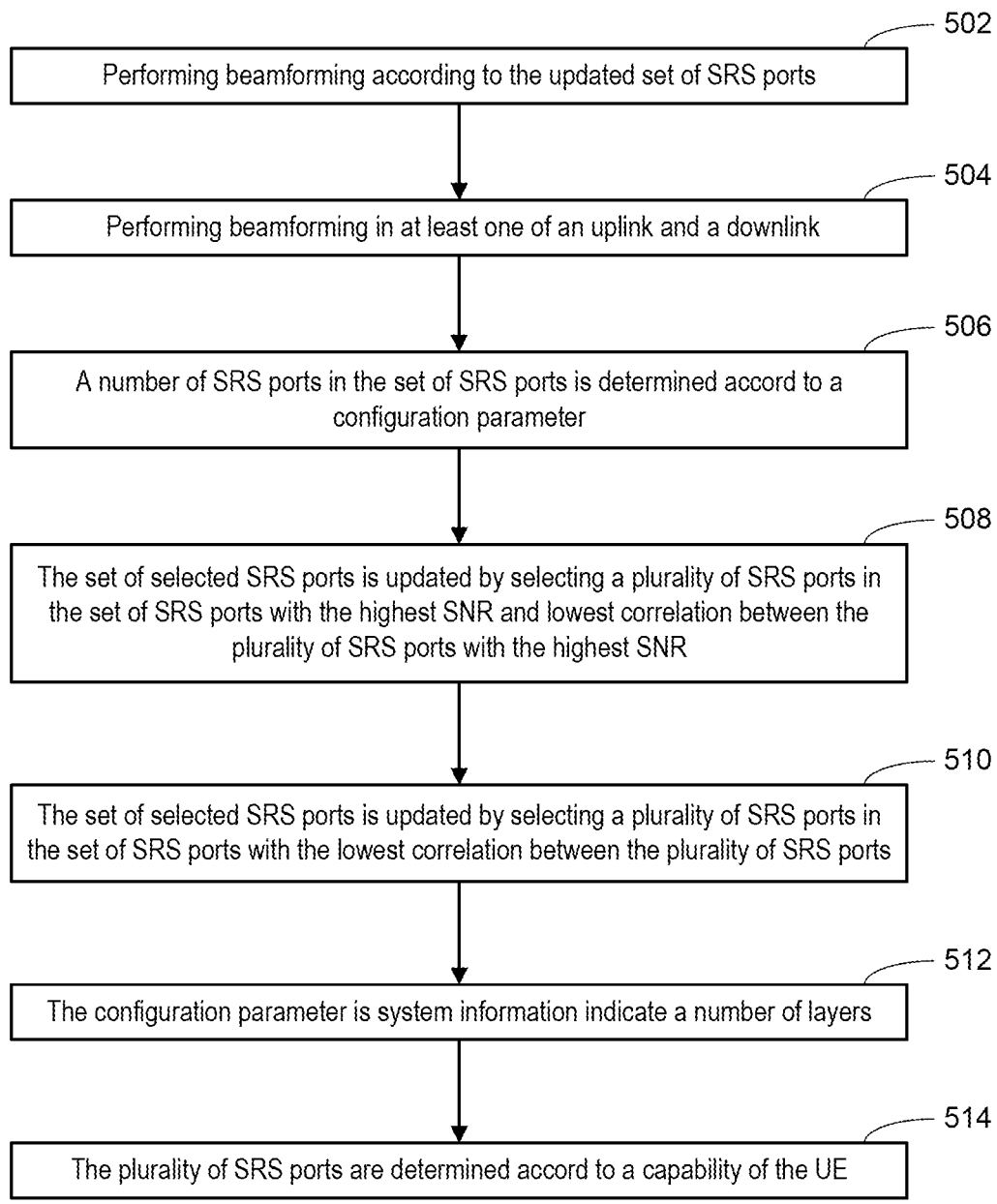
FIG. 5 is a flowchart of additional implementations of selecting layers and ports for MIMO beamforming according to some embodiments.

FIG. 5 is a flowchart of an example process 500 including additional implementations of selecting layers and ports for MIMO beamforming. In some implementations, one or more process blocks of FIG. 5 may be performed by a device.

Process 500 may include additional implementations, such as any single implementation or any combination of implementations described below and/or in connection with one or more other processes described elsewhere herein. In a first implementation, at 502 the process may include performing beamforming according to the updated set of SRS ports.

In a second implementation, alone or in combination with the first implementation, at 504 beamforming is performed in at least one of an uplink and a downlink.

In a third implementation, alone or in combination with the first and second implementation, at 506 a number of SRS ports in the set of SRS ports is determined according to a configuration parameter.

In a fourth implementation, alone or in combination with one or more of the first through third implementations, at 508 the set of selected SRS ports is updated by selecting a plurality of SRS ports in the set of SRS ports with the highest SNR and lowest correlation between the plurality of SRS ports with the highest SNR.

In a fifth implementation, alone or in combination with one or more of the first through fourth implementations, at 510 the set of selected SRS ports is updated by selecting a plurality of SRS ports in the set of SRS ports with the lowest correlation between the plurality of SRS ports.

In a sixth implementation, alone or in combination with one or more of the first through fifth implementations, at 512 the configuration parameter is system information indicating a number of layers.

In a seventh implementation, alone or in combination with one or more of the first through sixth implementations, at 514 the plurality of SRS ports are determined according to a capability of the UE.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Other variations to the disclosed embodiments can be understood and effected by those skilled in the art in practicing the recited features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to an advantage.

Operations like acquiring, accessing, analyzing, capturing, comparing, estimating, determining, initializing, performing, receiving, repeating, setting, selecting, measuring can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of selecting layers and ports for Multiple-Input-Multiple-Output (MIMO) beamforming, the method comprising:
    receiving a plurality of Sounding Reference Signals (SRSs) transmitted by a plurality of SRS ports, wherein each of the plurality of SRSs corresponds with a SRS port of a User Equipment (UE);
    measuring a Signal-to-Noise Ratio (SNR) for each of the plurality of SRS ports;
    estimating a wideband channel port correlation matrix across the plurality of SRS ports;
    setting a correlation threshold;
    setting a SNR threshold; and
    selecting one or more SRS ports from the plurality of SRS ports that satisfy a condition of being equal to or less than the correlation threshold and equal to or greater than the SNR threshold, wherein a number of layers is selected such that the layers correspond with a total number of SRS ports that satisfy the condition of being equal to or less than the correlation threshold and equal to or greater than the SNR threshold,
    wherein selecting the one or more SRS ports comprises:
        initializing a set of SRS ports by selecting the SRS port with the highest SNR;
        determining if a correlation between the selected SRS port and each other SRS port of the plurality of SRS ports satisfies the condition of being equal to or less than the correlation threshold and equal to or greater than the SNR threshold;
        selecting a next SRS port;
        determining if the correlation between the next selected SRS port and each other SRS port of the plurality of SRS ports satisfies the condition of being equal to or less than the correlation threshold and equal to or greater than the SNR threshold;
        repeating the selecting a next SRS port and the determining for each SRS port of the plurality of SRS ports until all SRS ports of the plurality of SRS ports are tested against the condition; and
        updating the set of SRS ports with all SRS ports that satisfy the condition of being equal to or less than the correlation threshold and equal to or greater than the SNR threshold.

2. The method according to claim 1, further comprising performing beamforming according to the updated set of SRS ports.

3. The method according to claim 2, wherein beamforming is performed in at least one of an uplink and a downlink.

4. The method according to claim 1, wherein the plurality of SRS ports are determined according to a capability of the UE.

5. The method according to claim 1, wherein a number of SRS ports in the set of SRS ports is determined according to a configuration parameter.

6. The method according to claim 5, wherein the set of selected SRS ports is updated by selecting a plurality of SRS ports in the set of SRS ports with the highest SNR and lowest correlation between the plurality of SRS ports with the highest SNR.

7. The method according to claim 5, wherein the set of selected SRS ports is updated by selecting a plurality of SRS ports in the set of SRS ports with the lowest correlation between the plurality of SRS ports.

8. The method according to claim 5, wherein the configuration parameter is system information indicating the number of layers.

9. A wireless communication apparatus comprising:
    a memory configured to store a plurality of instructions; and
    processor circuitry coupled to the memory and configured to execute the plurality of instructions to:
        receive a plurality of Sounding Reference Signals (SRSs) transmitted by a plurality of SRS ports, wherein each of the plurality of SRSs corresponds with an SRS port of a User Equipment (UE);
        measure a Signal-to-Noise Ratio (SNR) corresponding to each of the plurality of SRS ports;
        estimate a wideband channel port correlation matrix across the plurality of SRS ports;
        set a correlation threshold;
        set a SNR threshold; and
        select one or more SRS ports from the plurality of SRS ports that satisfy a condition of being equal to or less than the correlation threshold and equal to or greater than the SNR threshold,
    wherein the processor is further configured to execute the plurality of instructions to:
        initialize a set of SRS ports by selecting the SRS port with the highest SNR;
        determine if a correlation between the selected SRS port and each other SRS port of the plurality of SRS ports satisfies the condition of being equal to or less than the correlation threshold and equal to or greater than the SNR threshold;
select a next SRS port;
determine if the correlation between the next selected SRS port and each other SRS port of the plurality of SRS ports satisfies the condition of being equal to or less than the correlation threshold and equal to or greater than the SNR threshold;
repeat the selecting a next SRS port and the determining for each SRS port of the plurality of SRS ports until all of the plurality of SRS ports are tested against the condition; and
update the set of SRS ports with all SRS ports that satisfy the condition of being equal to or less than the correlation threshold and equal to or greater than the SNR threshold.

10. The wireless communication apparatus according to claim 9, wherein the processor is further configured to execute the plurality of instructions to perform beamforming according to the updated set of SRS ports.

11. The wireless communication apparatus according to claim 10, wherein beamforming is performed in at least one of an uplink and a downlink.

12. The wireless communication apparatus according to claim 9, wherein the plurality of SRS ports are determined according to a capability of the UE.

13. The wireless communication apparatus according to claim 9, wherein a total number of SRS ports in the set of SRS ports is limited according to a configuration parameter.

14. The wireless communication apparatus according to claim 13, wherein the set of selected SRS ports is updated be selecting a plurality of SRS ports in the set of SRS ports with the highest SNR and lowest correlation between the plurality of SRS ports with the highest SNR.

15. The wireless communication apparatus according to claim 13, wherein the set of selected SRS ports is updated be selecting a plurality of SRS ports in the set of SRS ports with the lowest correlation between the plurality of SRS ports.

16. The wireless communication apparatus according to claim 13, wherein the configuration parameter is system information indicating the number of layers.

17. A non-transitory computer-readable storage medium having instructions stored therein that when executed by processing circuitry, cause the processing circuitry to execute a process, the process comprising:
receiving a plurality of Sounding Reference Signals (SRSs) transmitted by a plurality of SRS ports, wherein each of the plurality of SRSs corresponds with an SRS port of a User Equipment (UE);
measuring a Signal-to-Noise Ratio (SNR) for each of the plurality of SRS ports;
estimating a wideband channel port correlation matrix across the plurality of SRS ports;
setting a correlation threshold;
setting a SNR threshold; and
selecting one or more SRS ports from the plurality of SRS ports that satisfy a condition of being equal to or less than the correlation threshold and equal to or greater than the SNR threshold,
wherein the instructions further cause the processing circuitry to execute a process,
the process comprising:
initializing a set of SRS ports by selecting the SRS port with the highest SNR;
determining if a correlation between the selected SRs port and each other SRS port of the plurality of SRS ports satisfies the condition of being equal to or less than the correlation threshold and equal to or greater than the SNR threshold;
selecting a next SRS port;
determining if the correlation between the next selected SRS port and each other SRS port of the plurality of SRS ports satisfies the condition of being equal to or less than the correlation threshold and equal to or greater than the SNR threshold;
repeating the selecting a next SRS port and the determining for each SRS port of the plurality of SRS ports until all SRS ports of the plurality of SRS ports are tested against the condition; and
updating the set of SRS ports with all SRS ports that satisfy the condition of being equal to or less than the correlation threshold and equal to or greater than the SNR threshold.

* * * * *